(12) United States Patent
Scholz et al.

(10) Patent No.: US 11,499,349 B2
(45) Date of Patent: Nov. 15, 2022

(54) MOTOR VEHICLE BOWDEN CABLE ARRANGEMENT

(71) Applicant: Kiekert AG, Heiligenhaus (DE)

(72) Inventors: Michael Scholz, Essen (DE); Ömer Inan, Dorsten (DE); Manuel Reusch, Düsseldorf (DE)

(73) Assignee: Kiekert AG, Heiligenhaus (DE)

( * ) Notice: Subject to any disclaimer, the term of this patent is extended or adjusted under 35 U.S.C. 154(b) by 52 days.

(21) Appl. No.: 16/980,567

(22) PCT Filed: Feb. 27, 2019

(86) PCT No.: PCT/DE2019/100176
§ 371 (c)(1),
(2) Date: Sep. 14, 2020

(87) PCT Pub. No.: WO2019/174668
PCT Pub. Date: Sep. 19, 2019

(65) Prior Publication Data
US 2021/0254374 A1    Aug. 19, 2021

(30) Foreign Application Priority Data

Mar. 15, 2018    (DE) .................... 10 2018 106 015.7

(51) Int. Cl.
| E05B 81/06 | (2014.01) |
| E05B 79/20 | (2014.01) |
| E05B 81/20 | (2014.01) |
| E05B 81/24 | (2014.01) |
| F16C 1/22 | (2006.01) |

(52) U.S. Cl.
CPC .............. *E05B 81/06* (2013.01); *E05B 79/20* (2013.01); *E05B 81/20* (2013.01); *E05B 81/25* (2013.01); *E05Y 2900/531* (2013.01); *F16C 1/226* (2013.01); *F16C 2350/52* (2013.01)

(58) Field of Classification Search
CPC .......... E05B 81/06; E05B 81/20; E05B 81/25; E05B 79/20; E05Y 2900/531; F16C 1/226; F16C 2350/52; F15C 1/08
See application file for complete search history.

(56) References Cited

U.S. PATENT DOCUMENTS

| 6,102,454 | A | 8/2000 | Weyerstall | |
| 8,297,147 | B2 * | 10/2012 | Wu | A47C 7/00 |
| | | | | 74/502.2 |

FOREIGN PATENT DOCUMENTS

| DE | 9206249 U1 * | 8/1992 | ............. F16C 1/226 |
| DE | 9206249 U1 | 10/1992 | |

(Continued)

OTHER PUBLICATIONS

Translation of International Search Report dated Jun. 7, 2019 for PCT/DE2019/100176.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A motor vehicle Bowden cable arrangement, in particular for application in the event of and in conjunction with motor vehicle door locks. The Bowden cable arrangement has a core and a sheath which accommodates the core. Moreover, a spring is implemented between the sheath and an abutment. The abutment is formed on or in a support which is preferably mounted flying on the sheath.

17 Claims, 2 Drawing Sheets

(56) References Cited

FOREIGN PATENT DOCUMENTS

| | | | |
|---|---|---|---|
| DE | 102007057595 A1 * | 6/2009 | ................ F16C 1/22 |
| DE | 102007057595 A1 | 6/2009 | |
| DE | 102015100750 A1 | 7/2016 | |
| DE | 102015217115 A1 * | 3/2017 | ............. E05B 85/20 |
| DE | 102015217115 A1 | 3/2017 | |
| WO | 2016193804 A1 | 8/2016 | |
| WO | WO-2016193804 A1 * | 12/2016 | .............. F16C 1/105 |

* cited by examiner

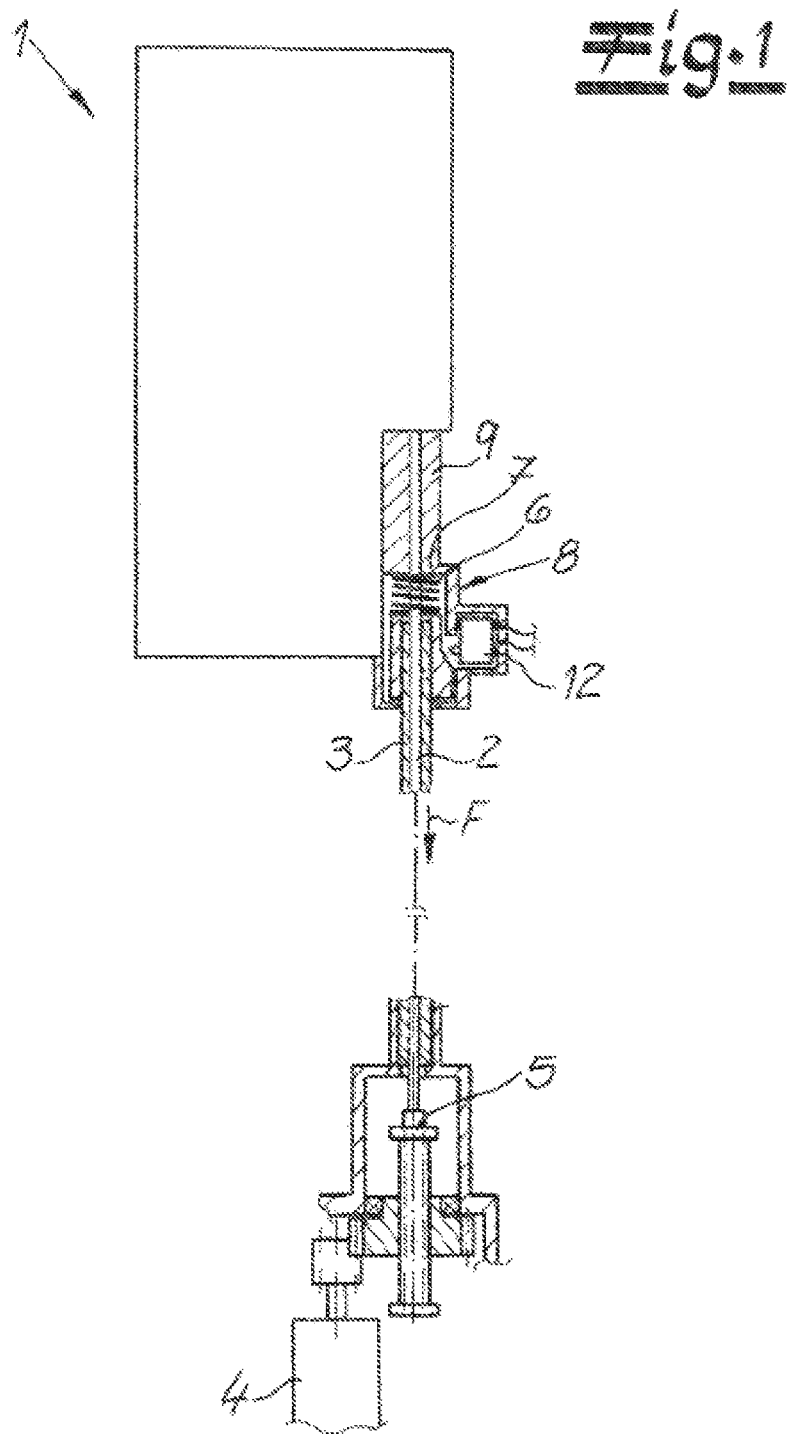

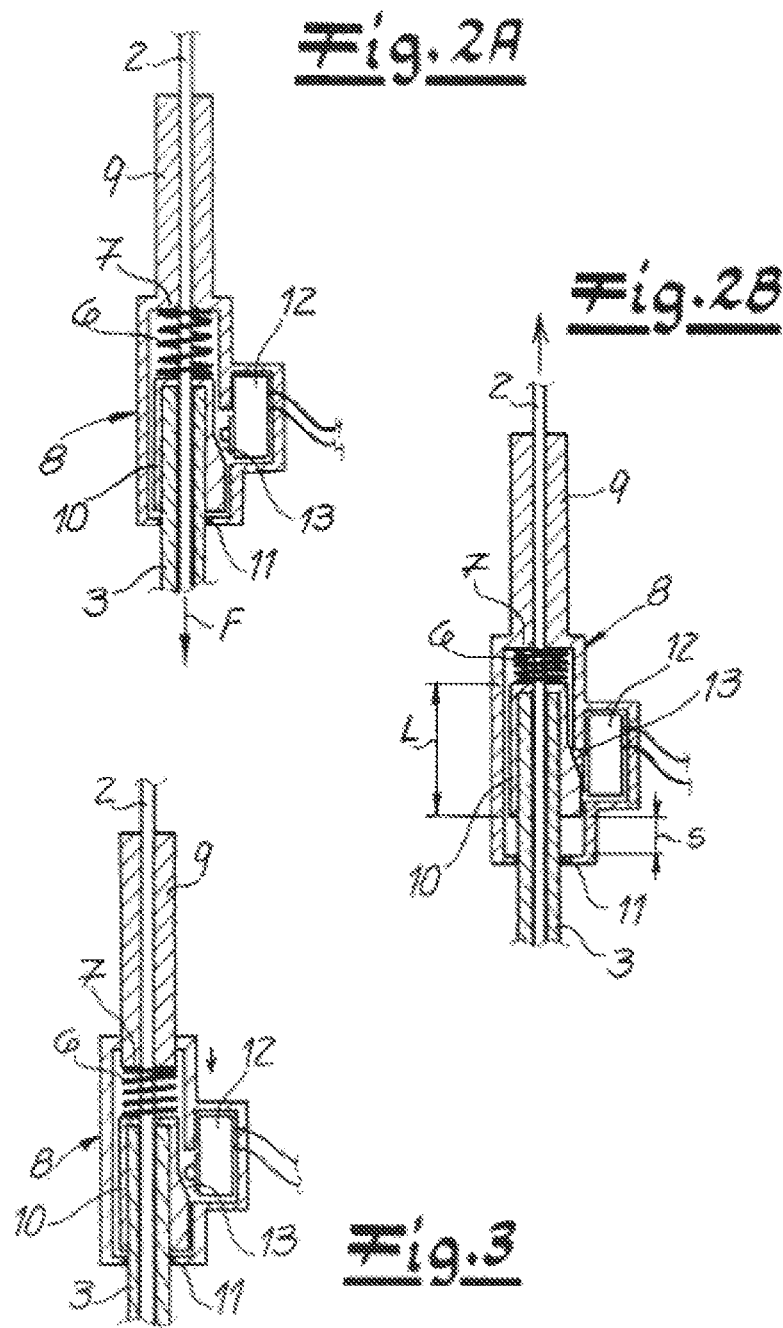

MOTOR VEHICLE BOWDEN CABLE ARRANGEMENT

FIELD OF INVENTION

The invention relates to a motor vehicle Bowden cable arrangement, in particular for use in and in conjunction with motor vehicle door locks, comprising a core and a sheath that receives the core, and comprising a spring between the sheath and an abutment.

BACKGROUND OF INVENTION

Motor vehicle Bowden cable arrangements have various uses in motor vehicles. Examples for the use thereof are fuel filler door release systems, front flap and tailgate release systems, seat adjustment means, window lifters, and sliding door adjustment means, to name but a few. It very particularly preferably relates to motor vehicle Bowden cable arrangements which are used for application in and in conjunction with motor vehicle door latches. Indeed, motor vehicle door latches are typically coupled, by a Bowden cable arrangement of this kind, to an inside door handle, an outside door handle, or in a closing aid.

In particular, in the case of what are known as closing aids or closing drives, the Bowden cable arrangement transmits high forces from the drive to for example a catch as part of a locking mechanism in the interior of the associated motor vehicle door latch. This is necessary in order for example to transfer a motor vehicle door located in the pre-ratchet position, or a door leaf, counter to door rubber forces or general closing forces, into the main ratchet position. As soon as the relevant door leaf, in the described procedure, is in the main ratchet position, in general an associated closing drive is deactivated. Nonetheless, force peaks may occur here, which are observed for example if, in winter, opposing forces of frozen rubber seals have to be overcome. Furthermore, jamming in the door crack may occur. For this reason, minimum tractive forces are typically used here, which ensure that the main ratchet position is reliably assumed at all conceivable temperatures and functional states.

Similar force peaks are observed if, for example, a motor vehicle door latch is opened mechanically, by means of an inside door handle or outside door handle. In this case, in particular in the case of older vehicle and unfavorable weather conditions, such as doors which are frozen closed, a user often applies high forces. Although, at this point, there are already approaches for opening the motor vehicle door latches in question in a purely electrical manner, such solutions are expensive.

However, in the case of purely mechanical motor vehicle door latches there are hitherto no convincing solutions with respect to being able to absorb force peaks in conjunction with Bowden cable arrangements of this kind, and in particular to reduce damage of elements involved, such as the inside door handle, outside door handle or closing drive. There are, however, already approaches, in the generic prior art according to U.S. Pat. No. 6,104,454 to the effect of operating a motor vehicle door latch by means of a Bowden cable, a spring, and a switch as a sensor. In this connection, the switch as a sensor is used for recording the opening state of a lever. In contrast, the spring ensures that the sheath of the Bowden cable arrangement is reset without problem following operation.

SUMMARY OF INVENTION

The technical problem addressed by the invention is that of developing a motor vehicle Bowden cable arrangement of this kind such that damage to elements involved, such as in particular door handles, closing aids, drives, etc., is prevented in a mechanically simple manner. Furthermore, any injuries to involved users should be reliably prevented.

In order to solve this technical problem, the invention proposes, in the case of a generic motor vehicle Bowden cable arrangement, in particular for application in and in conjunction with motor vehicle door latches, for the abutment to be formed on or in a support which is preferably mounted in a cantilever manner on the sheath. However, as an alternative to the cantilever mounting, the support can also be mounted in a stationary manner. In this case, for example a mechanical coupling to or support on a casing, the motor vehicle bodywork or the like is recommended. In the event of use on and in conjunction with motor vehicle door latches, the support can be attached to a latch casing.

That is to say that the motor vehicle Bowden cable according to the invention can, by way of example and in a non-limiting manner, be arranged directly on the motor vehicle door latch. In this case, the support is mechanically coupled to the associated casing. However, it is also possible for the support to be mounted on the sheath in a cantilever manner. In this case, the motor vehicle Bowden cable arrangement in question can in principle be placed between two Bowden cables. Arrangement in the region of or on a closing aid is also possible, and is explicitly also covered by the invention. However, instead of the closing aid, the motor vehicle Bowden cable arrangement according to the invention can also be placed on another drive or in another motor vehicle.

Within the context of the invention, firstly the obligatory spring is arranged between the sheath receiving the core, and the abutment. The abutment itself is located on or in the support. Since, according to the invention, the support is usually mounted on the sheath in a cantilevered manner, the spring can firstly be designed such that quasi force limitation is provided thereby. This is because the spring between the sheath and the abutment is compressed only when a specified force, transmitted via the core, is exceeded.

In this case, the invention proceeds from a plurality of findings. Firstly, in the case of a Bowden cable arrangement it is known that the force transmission takes place in such a way that the sheath is designed so as to be stationary, whereas the core can move back and forth relative to the sheath. In this way it is possible for a force to be transmitted for example from an outside door handle to a locking mechanism in the interior of the motor vehicle door latch, by means of the core. The situation is comparable if, by means of the core, for example a pulling movement of a closing drive or a closing aid is exerted on the rotary latch of a locking mechanism in the interior of a motor vehicle door latch. In all these cases, it is possible to define a maximum force which the outside door handle or the closing drive of the motor vehicle door latch applies to the pawl and to the rotary latch, respectively.

In order to now prevent this maximum definable force from being exceeded, the motor vehicle Bowden cable arrangement according to the invention is equipped with tractive force limitation. This is because, as soon as, in the described scenario, a maximum tractive force at the core is exceeded, the spring which is quasi interposed in the longitudinal extension of the sheath ensures that tractive force limitation takes place and an applied higher tractive force directly corresponds to the compression of the spring.

For this purpose, the spring is supported on the sheath, at one end, and on the abutment, or a base as an abutment, at the other end, and furthermore the support is mounted on the sheath for example in a cantilever manner. That is to say that the sheath of the Bowden cable arrangement according to the invention is ultimately of a flexible length, which is explained by the quasi interposed spring. As soon as the force acting on the core is greater than the counterforce built up by the spring, the spring is compressed and, as a result, the length of the sheath is compressed at the same time. This is a clear indication that the maximum specified force, previously set by means of the spring, is exceeded. This has substantial advantages.

According to an advantageous embodiment, the support is equipped with an extension that receives the core and/or the sheath. As a result, the support can be quasi integrated into the axial course of the sheath, and the spring can be quasi interposed. Furthermore, the extension can ensure a mechanical connection of the support to a casing, for example. This is because the spring is supported on the sheath at one end, and on the abutment or the base in the support at the other end. The Bowden cable continues on the other side of the base in the support. This is ensured by the extension which either receives the core directly in the interior, i.e. renders an additional sheath superfluous, or receives, in the interior thereof, a further second partial sheath of the Bowden cable.

The support is generally designed so as to surround the spring. As a result, the spring is firstly guided faultlessly. At the same time, a surrounding design of the support for the spring ensures that the spring, as well as the sheath immersed in the housing, are protected from any contamination, from penetrating water, etc. This is because the housing is usually also sealed, which is expedient for example when used in the interior of a motor vehicle door, and in this case in particular in what is known as the wet area.

The support generally comprises an opening for the sheath, including the core guided therein. The opening can be sealed off from the sheath, in order to assist the above-described surrounding design of the support. Furthermore, in this connection the opening for the sheath inserted therein, in the support, and the extension, being opposite one another has proven itself.

The sheath is generally equipped with a collar, inside the support. As a result, the sheath is additionally stabilized, and is at the same time guided in the interior of the support. This is because the support is generally hollow-cylindrical in design. The collar can also be cylindrical, such that the collar and, with it, the sheath, can be guided in the interior of the support without problem. As a result, an immediately acting force limitation occurs if required, which is set having low coefficients of friction, between the sheath or the collar, and the support.

Furthermore, it is expedient for the collar to be of an axial length that specifies a maximum clearance with respect to the support. As already explained, the collar is also hollow-cylindrical, in particular partially hollow-cylindrical. In this way, the collar is given a specified axial length. Since the spring is positioned opposite the bottom of the collar at one end, and the base at the other end, on or in the support, and is clamped therebetween, it is thereby possible to specify, as a whole, the maximum clearance of the sheath or the spring. That is to say that, in conjunction with the design of the support and that of the spring, the axial length of the collar ensures that a maximum clearance of the sheath in the interior of the support is established. Within this maximum clearance, if the previously specified force is exceeded the spring can be compressed. If this maximum clearance is achieved, the spring is completely compressed.

According to a particularly important measure of the invention, the support is equipped with an integrated sensor. In this case, the sensor, just like the spring, is surrounded by the support and consequently protected against environmental influences. The sensor is designed such that it records or can record movements of the sheath or of the collar receiving the sheath. In this way, according to the invention the exceeding of the maximum specified force in the event of action of force is not only observed by an associated compression of the sheath of the Bowden cable, but rather this compression movement can be recorded by sensor, using the sensor.

Instead of scanning the compression movement of the sheath of the Bowden cable by means of the sensor, it is in principle also possible to arrange the spring between two cables of associated Bowden cables. In this case, too, a compression or stretching movement can be recorded by sensor, using the sensor positioned at this location.

In any case, the collar receiving the sheath is generally equipped with a projection or a contour which triggers the sensor. The sensor, in turn, is connected to the support or arranged in the interior. Thus, as soon as the sheath and, together therewith, the collar executes a movement in the interior or relative to the support, this movement is recorded by the sensor as soon as the contour on the collar triggers the sensor. As a result, for example a warning indicator can be displayed, which makes the user aware that the acting operating forces are too high.

Furthermore, the sensor signal can be used for example to deactivate a drive, and in particular a closing drive, in order to reliably prevent damage. It is also conceivable, however, to collect the signals in question for example in a type of error memory, and subsequently evaluate them. It is thus possible, on the basis of these data, to draw a conclusion relating to increasing wear of a closing drive or the malfunction thereof.

Finally, it has also been found to be particularly expedient for the support to comprise an adjustable base as the abutment. As already explained, the spring is supported on the sheath or the collar receiving the sheath, at one end, and on the base, as the abutment, in or on the support, at the other end. If said basis is then designed so as to be adjustable, and thus the abutment is also designed so as to be adjustable, it is possible to quasi pretension the spring and thus raise the maximum force which can be transmitted via the motor vehicle Bowden cable arrangement according to the invention, without activating the force limitation or without compression of the spring, and thus optionally triggering the sensor. In this way, the motor vehicle Bowden cable arrangement according to the invention can be flexibly adapted to various applications, while maintaining a basic construction and basic design of the spring. Possible replacement, and subsequent adjustment, are also possible without problem as a result. This reduces the production and assembly costs, because it is possible to revert to virtually one single, or just a few, versions of the motor vehicle Bowden cable arrangement. This is because the adjustment of the transmittable maximum force without activation of the force limitation can be flexibly adjusted to the intended use in each case. This has substantial advantages.

BRIEF DESCRIPTION OF DRAWINGS

In the following, the invention will be explained in greater detail with reference to drawings showing merely one exemplary embodiment, in which drawings:

FIG. 1 shows a motor vehicle Bowden cable arrangement according to the invention for use in conjunction with a motor vehicle door latch that is shown, FIG. 2A shows the motor vehicle Bowden cable arrangement in the non-operated state, FIG. 2B shows the object according to FIG. 2A in the operated state, and FIG. 3 shows a modified embodiment.

DETAILED DESCRIPTION

In the figures, a motor vehicle Bowden cable arrangement is shown which, in the present case and in a non-limiting manner, is used in conjunction with a motor vehicle door latch 1 which is shown, indicatively, merely in FIG. 1. The motor vehicle Bowden cable arrangement is assembled substantially from a core 2 and a sheath 3 that receives the core 2. As usual, the core 2 may be designed as a steel cable or a plastics cable. The sheath 3 can be a steel sheath or a plastics sheath. The core 2 can be moved axially back and forth, relative to the stationary sheath 3, as can be seen from comparing the non-operated state according to FIG. 2A and the operated state according to FIG. 2B. As usual, the sheath 3 functions, as a whole, as an abutment for the force transmission via the core 2.

According to the embodiment, the core 2 is connected to a displaceable carriage or a linear actuator 5 of a closing drive 4, 5. The linear actuator 5 is driven by means of an electric motor 4 and ensures, for example in the case of a closing process of a locking mechanism in the motor vehicle door latch 1, that the tractive forces F indicated in FIG. 1 are applied to the core 2. These tractive forces F can be transmitted via the core 2 as far as the interior of the motor vehicle door latch 1, because the core 2 is supported relative to the sheath 3, as an abutment, and can be moved back and forth relative to the sheath 3. The tractive movement indicated in FIG. 1 makes it possible for the core 2 to transfer a rotary latch (not shown explicitly), as a component of the locking mechanism, from a pre-ratchet position previously assumed thereby, into a main ratchet position. Details of a closing drive of this kind comprising a rotary latch on which a Bowden cable acts can be found in DE 10 2015 100 750 A1 by the applicant. This of course applies by way of example and is in no way limiting. This is because the Bowden cable 2, 3, consisting of the core 2 and the sheath 3, can of course also be acted on manually, by means of a door handle, although this is not shown.

It can be seen that a spring 6 is also provided. The spring 6 is located between the sheath 3 and an abutment 7. According to the invention, the abutment 7 is designed as a base 7 in or on a support 8. In the embodiment according to FIG. 1, the support 8 is rigidly connected to a casing of the motor vehicle door latch 1.

The support 8 can also be mounted on the sheath 3 in a cantilever manner, as can be seen from a comparison of FIGS. 2A and 2B. FIG. 2A shows operation of the core 2 in such a way that, in the example according to FIG. 1, traction or tractive forces F act on the core 2, via the closing drive 4, 5, in the direction shown in FIG. 2A. If, in the example, the force transmitted from the core 2 to the rotary latch in the interior of the motor vehicle door latch 1 exceeds a previously determined and specified force, this leads, according to the invention, to a tractive force limitation in the Bowden cable 2, 3 shown. In fact, in this case the Bowden cable 2, 3 undergoes longitudinal compression, as will be described in detail in the following.

It can firstly be seen that the support 8 is equipped with an extension 9 that receives the core 2 and/or the sheath 3 thereof. As a result, the support 8, including the extension 9, is mounted easily, and in a cantilever manner, on the sheath 3. This is because the support 8, including the extension 9, can perform a movement relative to the sheath 3, or the sheath 3 can be moved axially relative to the support 8, as is shown in FIG. 2B. A relative movement thus occurs between the sheath 3 and the support 8, including the extension 9 which is rigidly connected thereto. This also applies if the support 8 is coupled to the casing of the motor vehicle door latch 1 according to FIG. 1, by means of the extension 9.

The support 8 is designed, overall, so as to surround the spring 6. In fact, in the present case, the support 8 is designed as a hollow cylinder. The extension 9 is also cylindrical. The same applies for a collar 10 which surrounds the sheath 3 in the interior of the support 8. For this purpose, the support 8 is first equipped with an opening 11 in order that the sheath 3, including the core 2 guided therein, can be inserted into the hollow-cylindrical casing of the support 8 and be moved axially back-and-forth therein, as is clear from a comparison of FIGS. 2A and 2B. The collar 10 now has an axial length L which specifies a clearance in the interior of the hollow-cylindrical support 8. In fact, in the embodiment, the collar 10 and, together therewith, the sheath 3, can be moved from bottom to top, until the spring 6 is completely compressed between the sheath 3 or the collar 10 and the base 7 or the abutment, respectively. This is shown in FIG. 2B. Now, in conjunction with the dimensions of the support 8 and the design of the spring 6, the axial length L of the collar 10 specifies the maximum path s that can thereby be completed by the sheath 3 inside the support 8 until, in the present case, the spring 6 is completely compressed and the sheath 3 quasi bottoms out.

It is clear from FIG. 2B that this situation corresponds to a sensor 12 integrated in the support 8 being operated. In this case, the collar 10 is designed, overall, in such a way that the diameter thereof is adapted to the interior of the cylindrical support 8, and is thus guided in the interior of the support 8. Furthermore, the collar 10 comprises a projection or a contour 13 which, in the embodiment, interacts with the sensor 12. As soon as the sheath 3 and, therewith, the collar 10 has completed the maximum path s, according to the drawing in FIG. 2B, in the interior of the support 8, the contour 13 on the collar 10 ensures that the sensor 12 is operated. The operation of the sensor 12 may correspond to a switching signal which is used as a warning signal, as an error signal, or also for deactivating the closing drive 4, 5, as has already been described in detail above.

For example, it is conceivable for the retrieval of the switching signal or the signal of the sensor 12 to function or be interpreted as anti-trap protection. That is to say that, if for example the closing drive 4, 5, or the rotary latch which said drive acts on in the interior of the motor vehicle door latch 1, has not yet reached the end position thereof associated with the main ratchet position, the closing drive would normally act, with traction, on the rotary latch as before and in an undiminished manner. If the associated motor vehicle door cannot be closed, for example because this is prevented by an item of clothing in the door gap, this initially leads, according to the invention, to a maximum force, which can be transmitted by means of the Bowden cable or the core 2, being exceeded.

This force can be adjusted by means of the spring 6. This is because, as soon as the force in question is exceeded, this leads to the sheath 3 of the Bowden cable 2, 3 being compressed, as described, because the force built up by the core and absorbed by the sheath 3 as the abutment now exceeds the specified force, and consequently the spring 6 is compressed, in the example by means of further loading by the closing drive 4, 5. The transition from FIG. 2A to FIG. 2B corresponds thereto.

As soon as the collar 10 and, therewith, the sheath 3 has completed the maximum path s, the contour 13 on the collar 10 ensures that the sensor 12 is operated. In the present example, this may be interpreted as "jamming" of for example items of clothing or fingers, such that the closing drive 4, 5 can be deactivated immediately.

In an alternative embodiment, it is also possible to combine the described Bowden cable 2, 3, in conjunction with a drive for electrical door opening. In this case, for example an outside door handle is coupled to the Bowden cable 2, 3 in question. As soon as a specified force threshold is exceeded, in this connection, the sheath 3 again undergoes the described compression in the axial direction, and the sensor 12 is triggered. This may, in the example, be used for actuating an electrical opening drive. That is to say that, in this case, the electrical opening process is accompanied with an operation that requires a certain application of force and does not directly correspond to switch operation.

In the example shown in FIG. 1, the support 8 is connected to the casing of the motor vehicle door latch 1. In addition, cantilever mounting shown schematically in FIGS. 2A and 2B is of course also possible, as FIG. 3 also shows. In this embodiment, the base 7 representing the abutment of the support 8 can be adjusted axially. As a result, the preload of the spring 6 can change. As a consequence thereof, when the preload increases the force threshold can also be increased, which threshold has to be exceeded by the core 2 in order for the spring 6 to be compressed. As a result, the spring 6 can be adjusted to different usage conditions. According to the embodiment, the spring 6 is a helical spring. In principle, of course, other spring designs are also possible.

The invention claimed is:

1. A motor vehicle Bowden cable arrangement for a motor vehicle door latch, the motor vehicle Bowden cable arrangement comprising:
    a core;
    a sheath that receives the core;
    an abutment;
    a spring between the sheath and the abutment, wherein the abutment is formed on or in a support which is mounted on the sheath in a cantilever manner; and
    a collar that surrounds the sheath in an interior of the support, wherein the collar is wholly contained within the interior of the support and is moveable with the sheath to compress the spring, the collar has a surface that extends around and is in direct contact with an axial end of the sheath, and the sheath extends outward from the collar oppositely from the spring;
    wherein the collar is of an axial length that specifies a maximum path that the sheath can move inside the support in a direction that compresses the spring, and the axial length of the collar is greater than the maximum path that the sheath can move.

2. The motor vehicle Bowden cable arrangement according to claim 1, wherein the support is equipped with an extension that receives the core and/or the sheath.

3. The motor vehicle Bowden cable arrangement according to claim 1, wherein the support surrounds the spring.

4. The motor vehicle Bowden cable arrangement according to claim 1, wherein the support comprises an opening for the sheath, including the core guided therein.

5. The motor vehicle Bowden cable arrangement according to claim 4, wherein the opening in the support is arranged opposite an extension.

6. The motor vehicle Bowden cable arrangement according to claim 1, wherein the support comprises an integrated sensor.

7. The motor vehicle Bowden cable arrangement according to claim 6, wherein the sensor records movements of the sheath or of the collar receiving the sheath.

8. The motor vehicle Bowden cable arrangement according to claim 1, wherein the support comprises an adjustable base as the abutment.

9. The motor vehicle Bowden cable arrangement according to claim 1, wherein the core is connected to a linear actuator.

10. The motor vehicle Bowden cable arrangement according to claim 1, wherein the support and the sheath are configured for axial movement between the support and the sheath.

11. The motor vehicle Bowden cable arrangement according to claim 1, wherein the support is formed as a hollow cylinder.

12. The motor vehicle Bowden cable arrangement according to claim 1, wherein the support has a cylindrical extension.

13. The motor vehicle Bowden cable arrangement according to claim 6, wherein the collar comprises a projection or contour which interacts with the sensor.

14. The motor vehicle Bowden cable arrangement according to claim 1, wherein the spring is completely compressed when the sheath reaches an end of the maximum path of travel.

15. The motor vehicle Bowden cable arrangement according to claim 1, wherein the spring is a helical spring.

16. The motor vehicle Bowden cable arrangement according to claim 6 further comprising a closing drive, wherein the sensor corresponds to a switching signal for deactivating the closing drive.

17. The motor vehicle Bowden cable arrangement according to claim 1, wherein the spring abuts against the collar oppositely from the abutment.

* * * * *